INVENTOR.
LOUIS PILLEMER

Nov. 7, 1950 — L. PILLEMER — 2,528,972
PROPHYLACTIC TOXOID COMPOUND AND METHOD OF MAKING SAME
Filed May 15, 1947

INVENTOR.
LOUIS PILLEMER
BY Kenyon & Kenyon
ATTORNEYS

Patented Nov. 7, 1950

2,528,972

UNITED STATES PATENT OFFICE 2,528,972

PROPHYLACTIC TOXOID COMPOUND AND METHOD OF MAKING SAME

Louis Pillemer, Cleveland, Ohio, assignor to Western Reserve University, Cleveland, Ohio, a corporation of Ohio Application May 15, 1947, Serial No. 748,348

47 Claims. (Cl. 167—78)

1

This invention relates to new toxoid products which are sterile and highly antigenic and which are practically non-allergenic and non-anaphylactogenic and which are highly stable and to the method of producing the same.

These new products are obtained from bacterial culture media by means of a process which recovers practically quantitative yields free from allergenic and anaphylactogenic tissue proteins of the culture medium and protein degradation products such as proteoses, peptones, and amino acids and other substances ordinarily found in culture media such as carbohydrates, inorganic or organic salts and vitamins and bacteriological decomposition products such as proteins resulting from disintegration of dead bacteria which may likewise be allergenic and anaphylactogenic. The process is easily carried out, involves only simple manipulations and lends itself to large scale operations, limited only by the size and type of equipment available.

The process is essentially one of selective precipitation through controlling solutions of the toxoid or the toxin, and the various products found in the culture media to obtain the minimum solubility point of the toxoid or toxin or of the other materials which it has been found have minimum solubility points differing from the minimum solubility points of the toxid or toxin, followed by a treatment of the thus separated toxoid or toxin with a dipolar ion followed by filtration through a bacteriological filter.

The selective precipitation at the minimum solubility points is obtained by controlling primarily the pH and the concentration of organic solvent which is preferably methyl alcohol. The temperature is maintained below the critical point of protein denaturation by the organic solvent, which is near the freezing point, thus avoiding denaturation. The toxoid or toxin concentration is adjusted to allow protective stabilization of the toxoid or toxin molecules by virtue of protein-protein interactions.

The final product after treatment with the dipolar ion and bacteriological filtration is more stable than the toxoid or toxin of the culture medium. It has high antigenic potency for a given solid content. This simplifies its use since it may be given in larger immunizing doses, which have been found to be advisable, and since it may be used with other toxoids for multiple immunization without increase in volume and with only slight increase in total solids or nitrogen. It does less damage to the subject without allergenic or anaphylactogenic reactions.

2

It is preferred to convert the toxin of the bacteriological culture into toxoid prior to carrying out the process because of the undesirability of handling toxin instead of toxoid with the attendant dangers to personnel and because the toxoids are generally more stable than the toxins. In the cases of some toxins, the process can be carried through either with the toxin or the toxoid. In such cases, the toxin may be converted to the toxoid either after processing or at any intermediate step. In some cases, the acidities encountered in processing will destroy the toxin. In such cases, of course, the toxin must be converted to toxoid before processing.

In carrying out the process, methyl alcohol is the preferred organic solvent employed in adjusting solutions to the minimum solubility point of the toxoid or toxin or the allergenic or anaphylactogenic materials to be eliminated. Ethyl alcohol may be used, however, with highly satifactory results.

After the elimination of the allergenic and anaphylactogenic constituents of the parent culture medium, the toxoid is protected and stabilized both during further processing and after filtration by the addition of dipolar ions. These can be obtained from various dipolar compounds which must be non-toxic, non-allergenic, non-anaphylactogenic and which must not destroy the active toxoid principle. The product must be soluble in water in sufficient concentration to supply an adequate supply of dipolar ions for the protection and stabilization of the active toxoid principles. It has been found that certain amino acids, which meet the above requirements and which are soluble to at least 0.3 M in water, can be used as a source of dipolar ions. Suitable amino acids are glycine, alanine, taurine, and leucine. Glycine is most desirable since it is inexpensive and easily obtainable.

The filtration is carried out aseptically. An asbestos filter pad type of bacteriological filter may be employed. Sterilizing candles, such as the Berkefeld, may also be used.

The pH is preferably controlled by the use of acetate buffer systems since the acetate ion is closely related to the dipolar ions which are employed in stabilizing and filtering the final product.

This invention is particularly applicable to the preparation of prophylactic agents against tetanus, diphtheria and staphylococcus which are considered in detail here.

The drawings show flow sheets of processes involving the invention.

TETANUS

Figure 1:
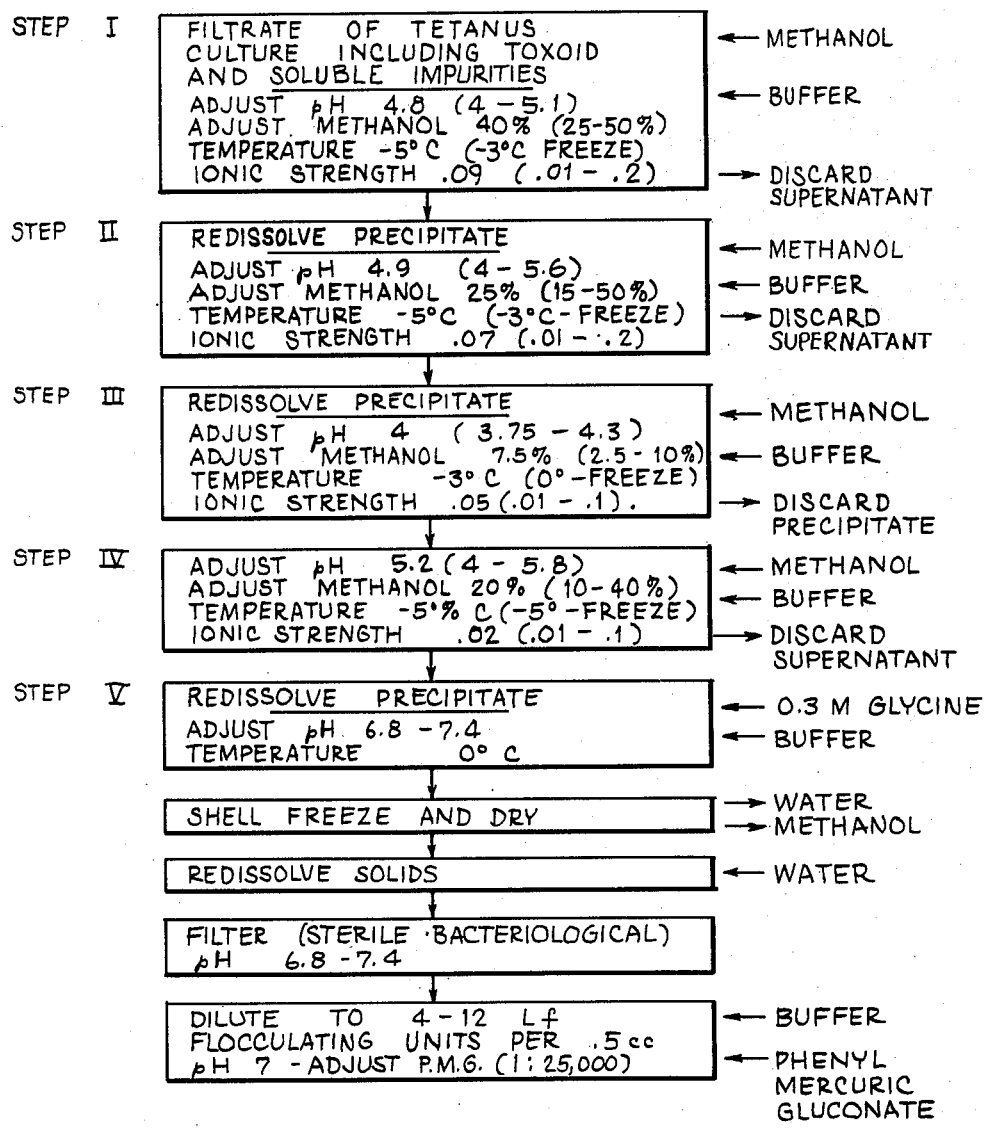
Fig. 1 is the flow sheet for the production of tetanal toxoid.
Figure 2:
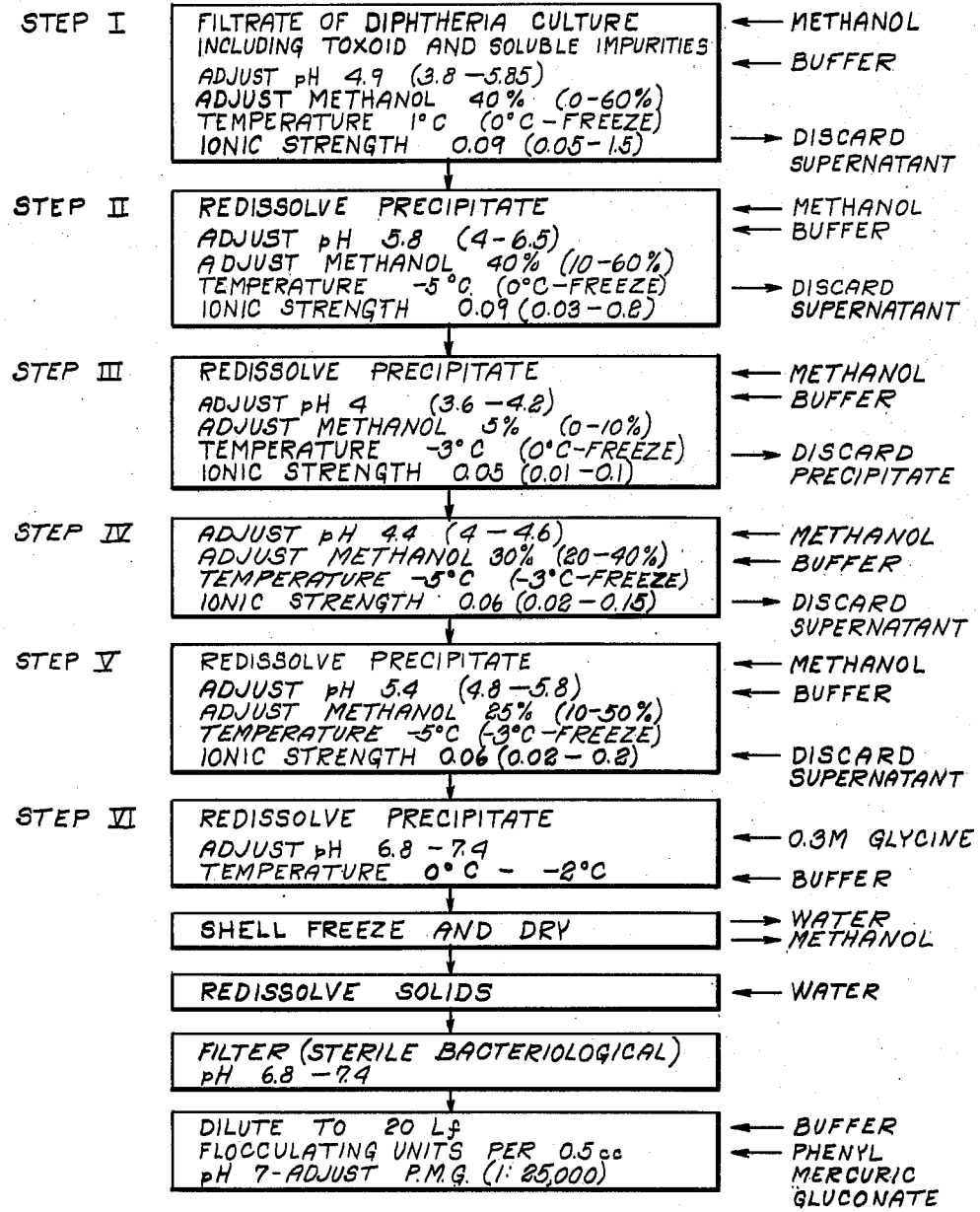
Fig. 2 is the flow sheet for the production of diphtheria toxoid.
Figure 3:
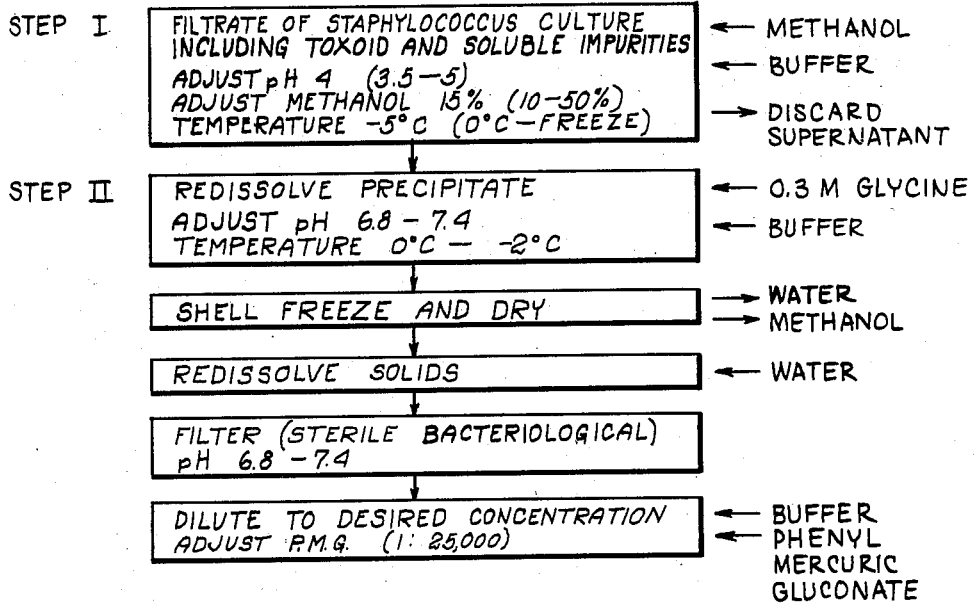
Fig. 3 is the flow sheet for the production of staphylococcus toxoid.

In preparing the prophylactic agent against tetanus, a culture medium of tetanus bacteria is employed. Any well known medium is satisfactory and the general procedures are not greatly influenced by the constituents of the medium. Ordinarily a bacterial filtrate is employed. It will contain approximately 99% of the various protein and protein degradation products and bacterial disintegration products and other substances of the culture medium and less than 1% of toxin or toxoid.

In the case of tetanus the process may be carried out either with the toxin or toxoid. It is preferable to use the toxoid because of its greater stability and because it is less dangerous to handle. It is preferable to convert the toxin or toxoid in the filtrate from the culture medium, although the conversion can be made at intermediate points in the processing without affecting the final product materially.

Step I

The first purification step comprises precipitation of the toxoid or toxin by adjusting the solution to the minimum solubility point of the toxin or toxoid. This is done by adjusting the pH, and the concentration of the organic solvent to be employed which is preferably methyl alcohol in water or may be ethyl alcohol in water.

The solution is adjusted to give a pH of 4.8, a methanol concentration of 40%, an ionic strength of 0.09 and a temperature of $-5°$ C.

The filtrate previously chilled to 1° C. is adjusted to pH 4.8. This is done with acetate buffer of pH 4 and of an ionic strength of 0.4. The mixture is chilled to $-5°$ C. and a calculated amount of methanol measured at $-5°$ C. and chilled to from $-10°$ C. to $-20°$ C. is added with stirring to produce a final concentration of 40% methanol. The temperature is maintained at $-5°$ C. for 24 hours. The precipitate is collected at $-5°$ C. by centrifuging and the supernatant liquid is discarded.

The pH for this first step may be varied from 4 to 5.1. The methanol concentration may vary from 25% to 50%. The ionic strength may be varied between 0.03 and 0.2. The temperature may be varied from $-3°$ C. to the freezing point of the mixture, care being taken to maintain it below the critical point of denaturation for any specific alcohol concentration.

The precipitate may be allowed to stand for from 12 hours to 2 weeks before its removal from the supernatant liquid.

Optimum results are obtained with the preferred adjustments but highly acceptable results are obtained within the variations described above and the product obtained is a product greatly superior to any heretofore produced.

The precipitate from this step may be processed by the dipolar ion treatment and bacteriological filtering later described to give a highly satisfactory product. It is preferred, however, to continue the processing by selective precipitation.

Throughout the process, methanol is preferred as the solvent although ethanol is acceptable and gives highly satisfactory results. Higher yields and greater stability, however, are obtained with methanol. That applies to the above step and to the remaining steps of the process.

The acetate buffer system is preferred because it fits in most satisfactorily with the preferred dipolar ion step in the production of the final sterile product.

Step II

The precipitate from the first step is dissolved in a volume equal to $1/25$ of the volume of the parent toxin or toxoid in a 0.15 M sodium acetate solution at $-3°$ C. The re-dissolution of the precipitate may be in various buffer systems and distilled water instead of the sodium acetate system. If the re-dissolution is in from $1/5$ of the parent toxoid volume to the maximum degree of solubility, desirable results are obtained.

The preferred re-precipitation is carried out at $-5°$ C. at a pH of 4.9, a methanol concentration of 25%, an ionic strength of 0.07.

The pH is adjusted to 4.9 with acetic acid and chilled to $-5°$ C. Methanol measured at $-5°$ C. and chilled to from $-10°$ C. to $-20°$ C. is added to the solution to give a final concentration of 25% methanol. The temperature is maintained at $-5°$ C. for 24 hours at which time the precipitate is collected at $-5°$ C. by centrifuging. The supernatant is discarded.

In carrying out this step of the process, the pH may be varied between 4 and 5.6. The methanol concentration may be reduced to as low as 15% or raised to 50%. The ionic strength may be varied between 0.01 and 0.2. The precipitate may stand from 12 hours to 2 weeks before removal from the supernatant. The temperature may vary between $-3°$ C. and the freezing point of the mixture, care being taken to maintain it below the critical point of denaturation for any specific alcohol concentration.

For optimum results, the preferred conditions should be maintained but highly acceptable results are obtained with the variations indicated.

The precipitate from this step may be subjected to the hereinafter described dipolar ion and bacteriological filtration steps to produce a highly acceptable product superior to any heretofore produced. It is preferred, however, to continue the selective precipitation.

Step III

The precipitate from the preceding step is dissolved in a volume equal to $1/15$ of the original parent toxin or toxoid volume in 0.15 M sodium acetate at $-3°$ C. Various other buffer systems can be employed. The preferred acetate buffer system gives best results and fits better into the dipolar ion treatment described later.

The next step in the preferred process is to adjust the pH, the methanol concentration, the ionic strength and the temperature to produce the precipitation of such impurities as have not been eliminated by the earlier steps in the process. The pH is adjusted to 4 and the methanol concentration to 7.5%, the ionic strength to 0.05 and the temperature to $-3°$ C.

The step is carried out by adjusting the pH to 4 with acetic acid at $-3°$ C. The methanol concentration is adjusted by adding measured quantities of methanol at $-3°$ C. to produce a methanol concentration of 7.5%. This is preferably done by adding 2 volumes 11.25% methanol. This mixture is stirred for two hours at $-3°$ C. The precipitate is collected by centrifuging at $-3°$ C. and discarded.

Although the preferred procedure is outlined above, the methanol concentration may be varied from 2.5% to 10%. The pH of the mixture may be varied from 3.75 to 4.3. The ionic strength may be varied between 0.01 and 0.1. The temperature may be varied between 0° C. and the freezing point but must be kept below the critical denaturation point for a specific alcohol concentration.

The supernatant is maintained at $-3°$ C. If dried the solute can be processed to give a highly acceptable final product. It is preferred, however, to further treat the supernatant to precipitate the active principle.

*Step IV*

The precipitation of this step is preferably done at a pH of 5.2, a methanol concentration of 20%, an ionic strength of 0.02 and a temperature of $-5°$ C.

This step is carried out by adjusting the pH to 5.2 with sodium hydroxide at $-3°$ C. The mixture is chilled to $-5°$ C. and measured quantities of methanol previously chilled to $-10°$ C. are added to bring the final concentration to 20% methanol. The mixture is allowed to stand at $-5°$ C. for 48 hours. The precipitate is collected by centrifuging at $-5°$ C.

The methanol concentration for this step may be varied to from 10% to 40%. The pH may vary from 4 to 5.8. The ionic strength may be varied between 0.01 and 0.1 The temperature may vary from $-5°$ C. and the freezing point of the mixture, care being taken to keep it below the critical point of denaturation for any specific alcohol concentration.

The precipitate is retained and the supernatant discarded. The precipitate is dissolved in 1/30 of the original parent toxoid or toxin in volume with 0.3 M. glycine. The pH is adjusted to from 6.8 to 7.4 with sodium hydroxide. It is possible to use a 0.012 M phosphate buffer of pH 7.4.

*Step V*

The precipitate which is retained after with the first, second and fourth precipitation may be processed to a final product. The precipitation selected from these precipitates for use will determine the purity of the final product, the precipitate from the last step having greater purity. The final processing is identical regardless of which of the precipitates is selected.

As pointed out above the process is applicable to both tetanus toxin or toxoid. The toxin in the culture or the filtrate therefrom can be converted to toxoid before processing. If this is not done, the toxin may be converted to toxoid along the line. For instance, the toxin of the first, second or fourth step can be converted. The conversion may be by adding 0.05 to 0.3% formalin followed by aging until toxicity disappears. Other methods of converting toxin to toxoid may be employed.

The further treatment of either the toxin or toxoid from the first, second or fourth precipitations comprises re-dissolving the precipitate. This is preferably done in 1/30 of the volume of the parent toxin or toxoid volume with 0.3 M. glycine. The pH may be adjusted to from 6.8 to 7.4 with sodium hydroxide or sodium bicarbonate. The phosphate buffer may be employed. The temperature should be between 0° C. and $-2°$ C. The volume may be as large as 1/15 of the parent toxin or toxoid volume.

The dissolved material is immediately shell frozen and dried from the frozen state to less than 1% moisture. This step removes the methanol or ethanol and water.

This material may be maintained in the dried state although it is preferable that it be dissolved and sterilized by filtration with a bacteriological filter.

The addition of a dipolar ion to the toxoid prior to drying and prior to sterile filtration protects and stabilizes the toxoid, both during processing and after filtration. The dipolar ion can be obtained from various dipolar compounds which must be non-toxic, non-allergenic, non-anaphylactogenic and must not destroy the active toxoid principle. The compounds must be soluble in water in sufficient concentration to supply sufficient dipolar ions to protect the toxoid.

It has been found that certain amino acids which meet the above requirements and which are soluble to at least 0.3 M. can be used as a source of dipolar ions. Suitable amino acids are glycine, alanine, taurine and leucine. Glycine is most desirable since it meets the requirements and is inexpensive and easily obtainable.

The solution containing the dipolar ion and the toxoid is filtered aseptically. An asbestos filter pad type of bacteriological filter may be employed as well as sterilizing candles such as the Berkefeld filter. The filters are prepared for use by washing thoroughly with distilled water, then steam sterilizing, then washing with sterile distilled water, then with sterile phosphate buffer at pH 7.4 and finally with sterile 0.3 M. glycine.

The pH of the solution for filtration should be adjusted to from 6.8 to 7.4.

After filtration, the filter may be washed free of the toxoid by additional small amounts of the glycine solution.

The sterile toxoid may be diluted to 4 to 12 Lf, flocculating units, per 0.5 cc. with 0.3 M glycine buffered to pH 7 for immunizing purposes.

The glycine concentration may be varied between 0.15 M and 0.6 M, although best results are obtained with 0.3 M glycine.

A suitable germicide may be employed to maintain sterility. This is a matter of individual choice. Phenyl mercuric gluconate added to 1:25000 may be used. The product after sterile filtration may be alum precipitated.

In carrying out the purification process, it is preferable to employ an acetate buffer comprising acetic acid and sodium acetate. It is likewise preferable to adjust the ionic strength with sodium acetate because the acetic ion is closely related to the glycine ion and other ions which may be used in the bacteriological filtration step. Other buffers and salts, however, such as phosphate buffers may be employed and highly satisfactory results obtained.

Methanol is the preferred alcohol, although ethyl alcohol will produce satisfactory results and will not destroy the antigenic properties of the product.

Throughout the process, it is desirable to maintain relatively high concentrations of the toxin or toxoid. The toxin or toxoid is dipolar in its structure and, at the concentrations employed in carrying out the process, it tends to protect itself against deterioration.

The product of this invention is not adsorbable by bacteriological filters. It can hence be sterilized by filtration which has hitherto been practically impossible because no worth while yields could be obtained after filtration of purified toxoids.

The toxin and toxoid can not be subjected to heat sterilization because it is essential to their preservation that they be kept at low temperatures.

The bacteriological filtration step and the addition of the dipolar ion are useful in sterilizing and producing stable tetanus toxoid products, regardless of how the allergenic and anaphylactogenic constituents of the original or parent culture are removed. Not only is it possible to sterilize such products but they are given the properties of stability which are obtained when these constituents are eliminated by the process of this invention.

It is essential to control temperature with care during the purification with the alcohol present. As the alcohol concentration is increased at a given temperature, the tendency for the alcohol to denature the toxin or toxoid increases. If the alcohol concentration is between 30% and 50%, the temperature should be at or below −5° C. If it is between 15% and 30%, the temperature should be below −3° C. At less than 15% the temperatures should be below 0° C. If they are not, the alcohol will denature the toxin or toxoid since the temperature will be above the critical point of protein denaturation.

The product is extremely potent. Immunizing doses have only between 0.02 and 0.004 mg. nitrogen. The product is practically non-allergenic and non-anaphylactogenic since all significant quantities of the allergenic and anaphylactogenic constituents of the original or parent bacterial culture have been eliminated. Because of the low solid content and high antigenicity, the product can be incorporated with other toxoids for multiple immunization with no increase in volume and only a slight increase in total solids or nitrogen.

The product is more stable than the original toxin or toxoid. In fact, on aging, the product generally increases in potency. Heating at 37° C. for as long as one month does not lower the antigenicity but in most cases causes an increase.

The following are examples of the invention:

Example 1

A tetanus bacteriological culture medium is filtered and the filtrate is treated with 0.05 to 0.3% formalin to produce the toxoid.

One volume of the filtrate is chilled to 1° C. It is adjusted to pH 4.8 with pH 4 acetate buffer, comprising acetic acid and sodium acetate of ionic strength of 0.4. The mixture is chilled to −5° C. and the calculated amount of methanol, measured at −5° C. chilled to −10° C., is added to give, with stirring, a final concentration of 40% methanol.

The temperature is maintained at −5° C. After 24 hours the precipitate is collected at −5° C. by centrifuging.

The precipitate is re-dissolved in 0.15 M sodium acetate at −3° C. to 1/25 of the original or parent filtrate.

This solution is adjusted to pH 4.9 with acetic acid and chilled to −5° C. Methanol, measured at −5° C., and chilled to −10° C. is added to give a final concentration of 25% of methanol. The ionic strength is adjusted to 0.07 with sodium acetate if adjustment is necessary to give this ionic strength. The temperature is maintained at −5° C. and at the end of 24 hours the precipitate is collected by centrifuging at −5° C.

The precipitate is redissolved in 0.15 M sodium acetate at −3° C. to give a solution of 1/15 of the volume of the parent culture filtrate. The pH is rapidly adjusted with stirring with acetic acid to 4. Methanol is added to give a methanol concentration of 7.5%. This is done by adding 2 volumes of 11.25% methanol at −3° C. The ionic strength is adjusted to 0.05. The mixture is stirred for 2 hours at −3° C., and the precipitate is centrifuged out and discarded.

The pH of the supernatant is adjusted to pH 5.2 with sodium hydroxide at −3° C. The mixture is then chilled to −5° C. Methanol at −10° C. is added to give a final methanol concentration of 20%. Ionic strength is adjusted to 0.02. The temperature is maintained at −5° C. for 48 hours and the precipitate is collected by centrifuging.

The precipitate is dissolved in 1/30 of the volume of the original filtrate of 0.3 M glycine in water. The pH is adjusted to 7 with sodium hydroxide. The temperature is maintained below 0° C.

The solution is immediately shell frozen and dried from the frozen state to less than 1% moisture content thus removing the methanol.

The dried material is re-dissolved in distilled water 1/30 of the volume of the parent filtrate. The pH is adjusted to pH 7.2 to 7.4. This solution is filtered through a bacteriological filter under aseptic conditions. The filter is then flushed with a small amount of glycine.

The filter which is of the asbestos pad type is first prepared by washing in distilled water, then steamed, then washed with sterile distilled water, then with sterile phosphate buffer at pH 7.4 and finally with sterile 0.3 M glycine.

The sterile filtrate is diluted to dose concentration with 0.3 M glycine buffered to pH 7. Phenyl mercuric gluconate is added to maintain sterility. Starting with a parent toxoid of 6.6 Lf, flocculating units, per mg. of nitrogen, the final product had from 3300 to 3600 Lf per mg. of protein nitrogen.

Example 2

This is the same as Example 1 except that ethanol is employed instead of methanol.

Example 3

This is the same as Example 1 except that the selective precipitation ends at the second precipitation. Starting with a parent toxoid of 6.6 Lf per mg. of nitrogen, the final product had 1200 and 1600 Lf per mg. of protein nitrogen.

Example 4

This is the same as Example 3 except that ethanol is used instead of methanol.

Example 5

This is the same as Example 1 except that the selective precipitation ends after the first precipitation. Starting with a parent toxoid of 6.6 Lf per mg. of nitrogen, the final product had between 800 and 1000 Lf per mg. of protein nitrogen.

Example 6

This is the same as Example 5 except that ethanol is used instead of methanol.

Example 7

This is the same as Example 1 except that in the first precipitation the pH is adjusted to pH 4. The methanol concentration is adjusted to 25%. The ionic strength is adjusted to 0.03 and the temperature is kept at −3° C.

The precipitate is dissolved in ⅕ of the parent filtrate volume and in the second precipitation the pH is adjusted to 4, the methanol concentration to 15%, the ionic strength to 0.01 and the temperature to −3° C.

The precipitate is then dissolved in a volume ⅕ of the parent filtrate volume for the third precipitation. The pH is adjusted to 3.75, the methanol concentration to 2.5%, the ionic strength to 0.01 and the temperature to 0° C.

In the next precipitation the pH is adjusted to pH 4, the methanol concentration to 10%, the ionic strength 0.01 and the temperature to −5° C.

Example 8

This is the same as Example 7 except that ethanol is used instead of methanol.

Example 9

This is the same as Example 1 except that in the first precipitation the pH is adjusted to pH 5.1. The methanol concentration is adjusted to 50%. The ionic strength is adjusted to 0.2 and the temperature is kept substantially at the freezing point of the mixture.

The precipitate is dissolved to give a saturated solution and in the second precipitation the pH is adjusted to 5.6, the methanol concentration to 50%, the ionic strength is adjusted to 0.2 and the temperature is kept substantially at the freezing point of the mixture.

The precipitate is dissolved to give a saturated solution and in the second precipitation the pH is adjusted to 5.6, the methanol concentration to 50%, the ionic strength to 0.2 and the temperature substantially at the freezing point of the mixture.

The precipitate is then dissolved to give a saturated solution for the third precipitation. The pH is adjusted to 4, the methanol concentration to 10%, the ionic strength to 0.1 and the temperature to substantially the freezing point of the mixture.

In the next precipitation the pH is adjusted to pH 5.8, the methanol concentration to 20%, the ionic strength 0.1 and the temperature to approximately the freezing point of the mixture.

Example 10

This is the same as Example 9 except that ethanol is used instead of methanol.

Example 11

This is the same as Example 1 except that alanine is used instead of glycine.

Example 12

This is the same as Example 1 except that taurine is used instead of glycine.

Example 13

This is the same as Example 1 except that leucine is used instead of glycine.

Example 14

This is the same as Example 5 except that alanine is used instead of glycine.

Example 15

This is the same as Example 5 except that taurine is used instead of glycine.

Example 16

This is the same as Example 5 except that leucine is used instead of glycine.

The highest yields and the most effective product are obtained by using the preferred form of the invention described as Example 1. Highly acceptable results, however, are obtained in using the other forms of the invention.

DIPHTHERIA

In carrying out the process to produce a prophylactic agent against diphtheria, a culture medium of diphtheria bacteria is employed. Any well known medium is satisfactory and the general procedures are not greatly influenced by the constituents of the medium. Ordinarily a bacterial filtrate is employed. It will contain approximately 99% of the various protein and protein degradation products and porphyrins and bacterial disintegration products and other substances of the culture medium and less than 1% of toxin or toxoid.

In carrying out the process, the toxin of the filtrate is converted to toxoid with 0.05 to 0.3% formalin followed by aging until toxicity disappears. Other methods of converting toxin to toxoid may be employed. In carrying out the process, this conversion is essential because the diphtheria toxin is injured by adjustment of the pH to 6, or under.

*Step I*

The first purification step comprises precipitation of the toxoid by adjusting the solution to the minimum solubility point of the toxoid. This is done by adjusting the pH and the concentration of the organic solvent to be employed which is preferably methyl alcohol in water or may be ethyl alcohol in water.

An acetate buffer system is preferred because it fits in most satisfactorily with the preferred dipolar ion step in the product ion of the final sterile product. Other buffer systems can be employed and where it is necessary to approach neutrality the acetate system is too acid and it is necessary to employ a phosphate or similar buffer system.

The filtrate previously chilled to 1° C. is adjusted to pH 4.9. This is done with acetate buffer of pH 4 and of an ionic strength of 0.4. The mixture is chilled to −5° C. and a calculated amount of methanol measured at −5° C. and chilled to −20° C. is added with stirring to produce a final concentration of 40% methanol. The ionic strength is 0.09. The temperature is maintained at −5° C. for 24 hours. At this time, the precipitate is collected at −5° C. by centrifuging.

The pH for this first step may be varied from 3.8 to 5.85. The methanol concentration may vary from 0% to 60%. The ionic strength may vary from 0.05 to 1.5. The temperature may vary from 0° C. to the freezing point of the mixture. The precipitate may be allowed to stand for from 12 hours to 2 weeks before its removal from the supernatant.

When the pH is adjusted to 3.8, the minimum solubility point is reached without any methanol. However, yields at this point are not the optimum, although the danger of denaturation is eliminated.

Optimum results are obtained with the preferred adjustments but highly acceptable results are obtained within the above variations and the product is greatly superior to any heretofore produced.

The precipitate may be given the dipolar ion treatment and bacteriological filtration to be described later, but it is preferred to continue to selective precipitation.

Step II

The precipitate from the first step is dissolved in a volume equal to 1/10 of the volume of the parent toxoid in a 0.15 M sodium acetate solution at —3° C. Although this is the preferred concentration, the volume may vary from 1/5 of that of the parent toxoid to a volume which is saturated by the precipitate.

The preferred precipitation is carried out at —5° C. at pH 5.8 with a methanol concentration of 40% and an ionic strength of 0.09.

The pH is adjusted to 5.8 with acetic acid and chilled to —5° C. Methanol measured at —5° C. and chilled to —20° C. is added to the solution to give a final concentration of 40% methanol. The temperature is maintained at —5° C. for 24 hours at which time the precipitate is collected at —5° C. by centrifuging. The supernatant is discarded.

In carrying out this step of the process, the pH may be varied between 4 and 6.5. The methanol concentration may be varied between 0% and 60%. The ionic strength may vary between 0.03 and 0.2. The precipitate may stand from 12 hours to 2 weeks before the removal of the supernatant. The temperature may vary between 0° C. and the freezing point of the mixture, care being taken to maintain the temperature below the critical point of denaturation for any specific alcohol concentration.

For optimum results, the preferred conditions should be maintained, but highly acceptable results are obtained with the variations indicated. At pH 4, the presence of alcohol, is not essential for precipitation at the point of minimum solubility. This does not yield as good results as the optimum but does eliminate the possibility of alcohol denaturation of the toxoid.

This precipitate may be treated with dipolar ions and filtered as hereinafter described but further selective precipitation is preferred.

Step III

The precipitate obtained in the second step is dissolved in a volume equal to 1/40 of the parent toxoid in 0.15 M. sodium acetate at —3° C. Other buffer systems can be employed but the preferred acetate buffer fits better into the dipolar ion treatment described later.

The next step in the preferred process is to adjust the pH, the methanol concentration, the ionic strength and the temperature to produce the precipitation of such impurities as have not been eliminated by the earlier steps in the process. The pH is adjusted to 4 and the methanol concentration to 5%, the ionic strength to 0.05 and the temperature to —3° C. This is done by adjusting the pH to 4 with acetic acid at —3° C. The methanol concentration is adjusted by adding measured quantities of methanol at —3° C. to produce a methanol concentration of 5%. This is preferably done by adding 2 volumes of 7.5% methanol. The mixture is stirred for 2 hours at —3° C. and the precipitate collected by centrifuging at —3° C. is discarded.

Although the preferred procedure is outlined above, the methanol concentration may be varied from 0% to 10%. The pH of the mixture may be varied from 3.6 to 4.2. The ionic strength may be varied between 0.01 and 0.1. The temperature may be varied between 0° C. and the freezing point of the mixture, care being taken, however, to maintain the temperature below the critical point of alcohol denaturation for any specific alcohol concentration.

The supernatant is maintained at —3° C. If dried, the solute can be processed by dipolar ion treatment and bacteriological filtration to give a highly acceptable final product. It is preferred, to further treat the supernatant to precipitate the active principle.

Step IV

The precipitation of this step is preferably done at pH 4.4, a methanol concentration of 30%, an ionic strength of 0.06 and a temperature of —5° C.

This step is carried out by adjusting the pH to 4.4 with sodium hydroxide at —3° C. The mixture is chilled to —5° C. and measured quantities of methanol, previously chilled to —20° C., are added to give a final concentration of 30% methanol. The mixture is allowed to stand at —5° C. for 48 hours. The precipitate is collected by centrifuging at —5° C.

The methanol concentration for this step may be varied to from 20% to 40%. The pH may vary from 4 to 4.6. The ionic strength may vary from 0.02 to 0.15. The temperature may vary from —3° C. to the freezing point of the mixture, care being taken to keep it below the critical point of denaturation for any specific alcohol concentration.

The precipitate is retained and the supernatant discarded. The precipitate may be treated by the dipolar ion and bacteriological filtration, which is later described, but it is preferred to give an additional selective precipitation.

Step V

The precipitate from the preceding step is dissolved in a volume equal to 1/20 of the original parent toxoid volume in 0.15 M sodium acetate at —5° C. Other buffer systems could be employed, although the acetate buffer system is preferred for the reasons heretofore set forth.

The preferred precipitation from this solution is carried out at —5° C. at a pH of 5.4, a methanol concentration of 25% and an ionic strength of 0.06.

The pH is adjusted to 5.4 with acetic acid. Methanol measured at —5° C. and chilled to —20° C. is added to the solution to give a final concentration of 25% methanol. The temperature is maintained at —5° C. for 24 hours at which time the precipitate is collected at —5° C. by centrifuging. The supernatant is discarded.

In carrying out this step of the process, the pH may be varied between 4.8 and 5.8. The methanol concentration may be varied between 10% and 50%. The ionic strength may be varied between 0.02 and 0.2. The temperature may be varied between —3° C. and the freezing point of the mixture, care being taken, however, to maintain it below the critical denaturation point for any specific alcohol concentration.

Step VI

Further treatment of the toxoid is preferably re-dissolution in 1/30 of the volume of the parent toxoid with 0.3 M glycine. The pH may be adjusted to from 6.8 to 7.4 with sodium hydroxide, sodium bicarbonate, or phosphate buffer, or any buffer suitable for producing this pH. The temperature should be maintained between 0° C. and —2° C. The volume may be as large as 1/15 of the parent toxoid volume.

The dissolved material is immediately shell frozen and dried from the frozen state to less than 1% moisture. This step removes the methanol or ethanol and water.

This material may be maintained in the dried state, although it is preferable that it be dissolved and sterilized by filtration with a bacteriological filter.

The addition of a dipolar ion to the toxoid prior to drying and prior to sterile filtration protects and stabilizes the toxoid both during processing and after filtration. The dipolar ion can be obtained from various dipolar compounds which must be non-toxic, non-allergenic, non-anaphylactogenic and must not destroy the active toxoid principle. The compounds must be soluble in water in sufficient concentration to supply adequate dipolar ions to protect the toxoid.

It has been found that certain amino acids which meet the above requirements and which are soluble to at least 0.3 M can be used as a source of dipolar ions. Suitable amino acids are glycine, alanine, taurine and leucine. Glycine is most desirable because it is inexpensive and easily obtainable.

The solution containing the dipolar ions and the toxoid is filtered aseptically. An asbestos filter pad type filter may be employed as may sterilizing candles such as Berkefelds. The filters are prepared for use by washing thoroughly with distilled water and then steam sterilizing, then washing with sterile distilled water, then with sterile phosphate buffer at pH 7.4 and finally with sterile 0.3 M glycine.

The pH of the solution for filtration should be adjusted to from 6.8 to 7.4.

After filtration, the filter may be washed free of toxoid by additional small amounts of the glycine solution.

The sterile toxoid may be diluted to 20 Lf per 0.5 cc. with 0.3 M glycine buffered to pH 7 for immunizing purposes.

The glycine concentration may be varied between 0.15 M and 0.6 M, although best results are obtained with 0.3 M glycine.

A suitable germicide may be employed to maintain sterility. This is a matter of individual choice. Phenyl mercuric gluconate added to 1:25000 may be used. The product after sterile filtration may be alum precipitated. As in and for the same reasons set forth in the description of the process for making the prophylactic agent against tetanus acetate buffer is preferred for adjusting pH, although other buffers may be used.

Methanol is preferred to ethanol.

The concentrations of toxoid are maintained so that the dipolar toxoid may protect itself.

The product of this invention is not adsorbable by bacteriological filters. It can hence be sterilized by filtration which has been hereto practically impossible with purified toxoids.

The bacteriological filtration step and the addition of the dipolar ion are useful in sterilizing and producing stable diphtheria toxoid products regardless of how the allergenic and anaphylactogenic constituents and the porphyrine of the original or parent culture are removed. Not only is it possible to sterilize such products but they are given the properties of stability which are obtained when these conditions are eliminated by the process of this invention.

It is essential to control temperature with care during the purification with the alcohol present. As the alcohol concentration is increased at a given temperature, the tendency for the alcohol to denature the toxoid increases. If the alcohol concentration is between 30% and 50%, the temperature should be below −5° C. If it is between 15% and 30%, the temperature should be below −3° C. At less than 15%, the temperature should be below 0° C. If this is not done, the alcohol will denature the toxoid since the temperature will be above the critical point of protein denatúration.

The product is extremely potent. It is pratically non-allergenic and non-anaphylactogenic since all significant quantities of the allergenic and anaphylactogenic constituents of the original culture have been eliminated. Because of its low solid content and high potency, the product can be employed for multiple immunization with no increase in volume and only a slight increase in total solids or nitrogen.

The product is more stable than the original toxoid. On aging the product generally increases in potency. Incubation at 37° C. for as long as one month does not lower the antigenicity but in most cases causes an increase.

The following are examples of the invention:

*Example 1*

A diphtheria bacteriological culture medium is filtered and the filtrate is treated with 0.05 to 0.3% formalin to produce the toxoid.

One volume of the filtrate is chilled to 1° C. It is adjusted to pH 4.9 with pH 4 acetate buffer, comprising acetic acid and sodium acetate of ionic strength of 0.4. The mixture is chilled to −5° C., and the calculated amount of methanol, measured at −5° chilled to −20°, is added to give, with stirring, a final concentration of 40% methanol.

The temperature is maintained at −5° C. After 24 hours the precipitate is collected at −5° C. by centrifuging.

The precipitate is re-dissolved in 0.15 M sodium acetate at −3° C. to 1/10 of the original or parent filtrate.

This solution is adjusted to pH 5.8 with acetic acid and chilled to −5° C. Methanol, measured at −5° C. and chilled to −20° C., is added to give a final concentration of 40% of methanol. The ionic strength is adjusted to 0.09 with sodium acetate if adjustment is necessary to give this ionic strength. The temperature is maintained at −5° C. and at the end of 24 hours the precipitate is collected by centrifuging at −5° C.

The precipitate is re-dissolved in 0.15 M sodium acetate at −3° C. to give a solution of 1/40 of the volume of the parent culture filtrate. The pH is rapidly adjusted with stirring with acetic acid to 4. Methanol is added to give a methanol concentration of 5%. This is done by adding 2 volumes of 7.5% methanol at −3° C. The ionic strength is adjusted to 0.05. The mixture is stirred for 2 hours at −3° C. and the precipitate is centrifuged out and discarded.

The pH of the supernatant is adjusted to pH 4.4 with sodium hydroxide at −3° C. The mixture is then chilled to −5° C. Methanol at −20° C. is added to give a final methanol concentration of 30%. Ionic strength is adjusted to 0.05. The temperature is maintained at −5° C. for 48 hours and the precipitate is collected by centrifuging.

The precipitate is re-dissolved in 0.15 M sodium acetate at −5° C. to give a solution of 1/20 of the volume of the parent culture filtrate. The pH is rapidly adjusted with stirring with acetic acid to 5.4. Methanol is added to give a methanol concentration of 25%, the ionic strength is adjusted to 0.06 and the temperature is maintained at −5° C., the precipitate is centrifuged out and the supernatant is discarded.

The precipitate is dissolved in 1/30 of the volume of the original filtrate of 0.3 M glycine in water. The pH is adjusted to 7 with sodium hydroxide. The temperature is maintained below 0° C.

The solution is immediately shell frozen and dried from the frozen state to less than 1% moisture content thus removing the methanol.

The dried material is re-dissolved in distilled water 1/30 of the volume of the parent filtrate. The pH is adjusted to pH 7.2 to 7.4. This solution is filtered through a bacteriological filter under aseptic conditions. The filter is then flushed with a small amount of glycine.

The filter which is of the asbestos pad type is first prepared by washing in distilled water, then steamed, then washed with sterile distilled water, then with sterile phosphate buffer at pH 7.4 and finally with sterile 0.3 M glycine.

The sterile filtrate is diluted to dose concentration with 0.3 M glycine buffered to pH 7. Phenyl mercuric gluconate is added to maintain sterility.

The final product starting with a typical parent toxoid has 2000 to 2200 Lf per mg. of protein nitrogen.

Example 2

This is the same as Example 1 except that ethanol is employed instead of methanol.

*Example 3*

This is the same as Example 1 except that the selective precipitation ends at the second precipitation.

The final product starting with a typical parent toxoid has 1200 to 1400 Lf per mg. of protein nitrogen.

*Example 4*

This is the same as Example 3 except that ethanol is used instead of methanol.

*Example 5*

This is the same as Example 1 except that the selective precipitation ends after the first precipitation.

The final product starting with a typical parent toxoid has 800 to 1000 Lf per mg. of protein nitrogen.

*Example 6*

This is the same as Example 5 except that ethanol is used instead of methanol.

*Example 7*

This is the same as Example 1 except that the selective precipitation ends after the third precipitation.

*Example 8*

This is the same as Example 1 except that in the first precipitation the pH is adjusted to pH 3.8. The methanol concentration is adjusted to 0.1%. The ionic strength is adjusted to 0.05 and the temperature is kept at 0° C.

The precipitate is dissolved in 1/5 of the parent filtrate volume and in the second precipitation the pH is adjusted to 4, the methanol concentration to 0.8, the ionic strength to 0.03 and the temperature to 0° C.

The precipitate is then dissolved in a volume 1/5 of the parent filtrate volume for the third precipitation. The pH is adjusted to 3.6, the methanol concentration to .01, the ionic strength to 0.01 and the temperature to 0° C.

In the next precipitation the pH is adjusted to pH 4, the methanol concentration to 20%, the ionic strength 0.02 and the temperature to −3° C.

In the next precipitation the pH is adjusted to 4.8, the methanol concentration to 10%, the ionic strength to .02 and the temperature to −3° C.

*Example 9*

This is the same as Example 8 except that ethanol is used instead of methanol.

*Example 10*

This is the same as Example 1 except that in the first precipitation the pH is adjusted to pH 5.85. The methanol concentration is adjusted to 60%. The ionic strength is adjusted to 0.15 and the temperature is kept substantially at the freezing point of the mixture.

The precipitate is dissolved to give a saturated solution and in the second precipitation the pH is adjusted to 6.5, the methanol concentration to 60%, the ionic strength to 0.2 and the temperature substantially at the freezing point of the mixture.

The precipitate is then dissolved to give a saturated solution for the third precipitation. The pH is adjusted to 4.2, the methanol concentration to 10%, the ionic strength to 0.1 and the temperature to substantially the freezing point of the mixture.

In the next precipitation the pH is adjusted to pH 4.6, the methanol concentration to 40%, the ionic strength 0.15 and the temperature to approximately the freezing point of the mixture.

In the next precipitation, the pH is adjusted to 5.8, the methanol concentration to 50%, the ionic strength to 0.2 and the temperature to substantially the freezing point of the mixture.

*Example 11*

This is the same as Example 10 except that ethanol is used instead of methanol.

*Example 12*

This is the same as Example 1 except that alanine is used instead of glycine.

*Example 13*

This is the same as Example 1 except that taurine is used instead of glycine.

*Example 14*

This is the same as Example 1 except that leucine is used instead of glycine.

*Example 15*

This is the same as Example 5 except that alanine is used instead of glycine.

*Example 16*

This is the same as Example 5 except that taurine is used instead of glycine.

*Example 17*

This is the same as Example 5 except that leucine is used instead of glycine.

The highest yields and the most effective product are obtained by using the preferred form of the invention described as Example 1. Highly acceptable results, however, are obtained in using the other forms of the invention.

STAPHYLOCOCCUS

In carrying out the process a culture medium of staphylococcus bacteria is employed. Any well-known medium is satisfactory and the general procedures are not greatly influenced by the constituents of the medium. Ordinarily a bacterial filtrate is employed. It will contain approximately 90% of the various protein and protein degradation products and other substances of the culture medium and less than 1% of toxin or toxoid. In the case of staphylococcus the process may be carried out either with the toxin or toxoid. It is preferable to use the toxoid because of its greater stability and because it is less dangerous to handle. It is preferable to convert the toxin to toxoid in the filtrate from the culture medium, although the conversion can be made at an intermediate point.

Step I

The purification comprises precipitation of the toxin or toxoid by adjusting the solution to the minimum solubility point of the toxin or toxoid. This is done by adjusting the pH and the concentration of the organic solvent to be employed which is preferably methyl alcohol in water or may be ethyl alcohol in water.

The filtrate previously chilled to 1° C. is adjusted to pH 4. This is done with acetic acid. The mixture is chilled to −5° C. and a calculated amount of methanol measured at −5° C. and chilled to −20° C. is added with stirring to give a final concentration of 15% methanol. The temperature is maintained at −5° C. for 24 hours. The precipitate is collected at −5° C. by centrifuging and the supernatant liquid is discarded.

The pH may be varied from 3.5 to 5, the methanol concentration from 10% to 50% and the temperature from 0° C. to the freezing point of the mixture, care being taken to keep it below the critical point of denaturation for any specific alcohol concentration.

The precipitate may be allowed to stand for from 12 hours to 2 weeks before its removal from the supernatant liquid.

Optimum results are obtained with the preferred adjustment described above but a highly acceptable product can be obtained with the variations indicated.

The precipitate may be further processed by selective precipitation but satisfactory results are obtained if the selective precipitation is not continued further.

*Step II*

The precipitate is redissolved in 1/30 of the volume of the parent toxoid with 0.3 M glycine. The pH is adjusted to from 6.8 to 7.4 with sodium hydroxide, sodium bicarbonate, phosphate buffer or any other suitable buffer. The temperature is maintained between 0° C. and −2° C. The volume may be as large as 1/15 that of the parent toxoid.

The dissolved material is immediately shell frozen and dried from the frozen state to less than 1% moisture. This removes the methanol or ethanol and the water.

The material may be maintained in the dried state but it is preferred that it be dissolved and sterilized by filtration through a bacteriological filter.

The addition of a dipolar ion to the toxoid prior to drying and prior to sterile filtration protects and stabilizes the toxoid both during processing and after filtration. The dipolar ion can be obtained from various dipolar compounds which must be non-toxic, non-allergenic, non-anaphylactogenic and must not destroy the active toxoid principle. The compounds must be soluble in water in sufficient concentration to supply sufficient dipolar ions to protect the toxoid.

It has been found that certain amino acids which meet the above requirements and which are soluble to at least 0.3 M can be used as a source of dipolar ions. Suitable amino acids are glycine, alanine, taurine and leucine. Glycine is most desirable since it meets the requirements and is inexpensive and easily obtainable.

The solution containing the dipolar ion and the toxoid is filtered aseptically. An asbestos filter pad type of bacteriological filter may be employed as well as sterilizing candles such as the Berkefeld filter. The filters are prepared for use by washing thoroughly with distilled water, then steam sterilizing, then washing with sterile distilled water, then with sterile phosphate buffer at pH 7.4 and finally with sterile 0.3 M glycine.

The pH of the solution for filtration should be adjusted to from 6.8 to 7.4.

After filtration, the filter may be washed free of the antigen by additional small amounts of the glycine solution.

The glycine concentration may be varied between 0.15 M and 0.6 M, although best results are obtained with 0.3 M glycine.

A suitable germicide may be employed to maintain sterility. This is a matter of individual choice. Phenyl mercuric gluconate added to 1:25000 may be used. The product after sterile filtration may be alum precipitated.

In carrying out the purification process, it is preferable to employ an acetate buffer comprising acetic acid and sodium acetate. It is likewise preferable to adjust the ionic strength with sodium acetate because the acetate ion is closely related to the glycine ion and other ions which may be used in the bacteriological filtration step. Other buffers and salts, however, such as phosphate buffers may be employed and highly satisfactory results obtained.

Methanol is the preferred alcohol, although ethyl alcohol will produce satisfactory results and will not destroy the toxoid properties of the product.

Throughout the process, it is desirable to maintain relatively high concentrations of the toxin or toxoid. The toxin or toxoid is dipolar in its structure and at the concentrations employed in carrying out the process, it tends to protect itself against deterioration.

The product of this invention is not adsorbable by bacteriological filters.

It is essential to control temperature with care during the purification with the alcohol present. As the alcohol concentration is increased at a given temperature, the tendency for the alcohol to denature the toxin or toxoid increases. If the alcohol concentration is between 30% and 50% the temperature should be below −5° C. If it is between 15% and 30% the temperatures should be below −3° C. At less than 15% the temperatures should be below 0° C. If they are not, the alcohol will denature the toxin or toxoid since the temperature will be above the critical point of protein denaturation.

The product is extremely potent. The product is practically non-allergenic and non-anaphylactogenic since the significant quantities of the allergenic and anaphylactogenic constituents of the original or parent bacterial culture have been eliminated.

The product is more stable than the original toxin or toxoid. In fact, on aging, the product generally increases in potency. Heating at 37° C. for as long as one month does not lower the antigenicity but in most cases causes an increase.

The following are examples of the invention:

Example 1

A staphylococcus bacteriological culture medium is filtered and the filtrate is treated with 0.05 to 0.3% formalin to produce the toxoid.

One volume of the filtrate is chilled to 1° C. It is adjusted to pH 4 with acetic acid. The mixture is chilled to —5° C. and the calculated amount of methanol measured at —5° C. and chilled to —20° C. is added to give, with stirring, a final concentration of 15% methanol.

The temperature is maintained at —5° C. for 24 hours after which the precipitate is collected by centrifuging at —5° C.

The precipitate is redissolved in 1/30 of the volume of the original filtrate of 0.3 M glycine in water. The pH is adjusted to 7 with sodium hydroxide. The temperature is maintained below 0° C.

The solution is immediately shell frozen and dried from the frozen state to less than 1% moisture content thus removing the methanol.

The dried material is redissolved in distilled water 1/30 of the volume of the parent filtrate. The pH is adjusted to pH 7.2 to 7.4. This solution is filtered through a bacteriological filter under aseptic conditions. The filter is then flushed with a small amount of glycine.

The filter which is of the asbestos pad type is first prepared by washing in distilled water, then steamed, then washed with sterile distilled water, then with sterile phosphate buffer at pH 7.4 and finally with sterile 0.3 M glycine.

The sterile filtrate is diluted to dose concentration with 0.3 M glycine buffered to pH 7. Phenyl mercuric gluconate is added to maintain sterility.

Example 2

This is the same as Example 1 except that ethanol is employed instead of methanol.

Example 3

A staphylococcus bacteriological culture medium is filtered and the filtrate is treated with 0.05 to 0.3% formalin to produce the toxoid.

One volume of the filtrate is chilled to 1° C. It is adjusted to pH 3.5 with acetic acid. The mixture is chilled to —5° C. and the calculated amount of methanol measured at —5° C. and chilled to —20° C. is added to give, with stirring, a final concentration of 10% methanol.

The temperature is maintained at 0° C. for 24 hours after which the precipitate is collected by centrifuging at 0° C.

The precipitate is redissolved in 1/30 of the volume of the original filtrate of 0.3 M glycine in water. The pH is adjusted to 7 with sodium hydroxide. The temperature is maintained below 0° C.

The solution is immediately shell frozen and dried from the frozen state to less than 1% moisture content thus removing the methanol.

The dried material is redissolved in distilled water 1/30 of the volume of the parent filtrate. The pH is adjusted to pH 7.2 to 7.4. This solution is filtered through a bacteriological filter under aseptic conditions. The filter is then flushed with a small amount of glycine.

The filter which is of the asbestos pad type is first prepared by washing in distilled water, then steamed, then washed with sterile distilled water, then with sterile phosphate buffer at pH 7.4 and finally with sterile 0.3 M glycine.

The sterile filtrate is diluted to dose concentration with 0.3 M glycine buffered to pH 7. Phenyl mercuric gluconate is added to maintain sterility.

Example 4

This is the same as Example 3 except that ethanol is employed instead of methanol.

Example 5

A staphylococcus bacteriological culture medium is filtered and the filtrate is treated with 0.05 to 0.3% formalin to produce the toxoid.

One volume of the filtrate is chilled to 1° C. It is adjusted to pH 5 with acetic acid. The mixture is chilled to —5° C. and the calculated amount of methanol measured at —5° C. and chilled to —20° C. is added to give, with stirring, a final concentration of 50% methanol.

The temperature is maintained at substantially the freezing point of the mixture for 24 hours after which the precipitate is collected by centrifuging at substantially the freezing point of the mixture.

The precipitate is redissolved in 1/30 of the volume of the original filtrate of 0.3 M in water. The pH is adjusted to 7 with sodium hydroxide. The temperature is maintained below 0° C.

The solution is immediately shell frozen and dried from the frozen state to less than 1% moisture content thus removing the methanol.

The dried material is redissolved in distilled water 1/30 of the volume of the parent filtrate. The pH is adjusted to pH 7.2 to 7.4. This solution is filtered through a bacteriological filter under aseptic conditions. The filter is then flushed with a small amount of glycine.

The filter which is of the asbestos pad type is first prepared by washing in distilled water, then steamed, then washed with sterile distilled water, then with sterile phosphate buffer at pH 7.4 and finally with sterile 0.3 M glycine.

The sterile filtrate is diluted to dose concentration with 0.3 M glycine buffered to pH 7. Phenyl mercuric gluconate is added to maintain sterility.

Example 6

This is the same as Example 5 except that ethanol is employed instead of methanol.

Example 7

This is the same as Example 1 except that alanine is employed instead of glycine.

Example 8

This is the same as Example 1 except that taurine is employed instead of glycine.

Example 9

This is the same as Example 1 except that leucine is employed instead of glycine.

I claim:

1. The method of producing a sterile, stable, non-allergenic, non-anaphylactogenic product comprising toxoid from crude bacterial culture containing said toxoid which includes the step of separating said toxoid from a solution in water thereof and of the allergenic and anaphylactogenic constituents of said crude culture by adding to said solution an alcohol of the group consisting of methanol and ethanol and adjusting said solution to the minimum solubility point of said toxoid by controlling the concentration of said alcohol at from 25% to 50% and the pH at from 4 to 5, while maintaining the temperature below the critical point of protein denaturation at from −3° C. to the freezing point of the solution, separating the resulting precipitate of said toxoid from the supernatant, preparing a solution of said precipitated toxoid in a water solution of non-toxic, non-allergenic, non-anaphylactogenic dipolar ions derived from amino acids of the group consisting of glycine, taurine, leucine and alanine and filtering the solution through a sterile bacteriological filter.

2. The method of producing a sterile, stable, non-allergenic, non-anaphylactogenic product comprising a substance of the group consisting of tetanal toxin and toxoid from crude tetanal bacterial culture containing said substance which includes the step of separating said substance from a solution in water thereof and of the allergenic and anaphylactogenic constituents of said crude culture by adding to said solution an alcohol of the group consisting of methanol and ethanol and adjusting said solution to the minimum solubility point of said substance by controlling the concentration of said alcohol at from 25% to 50%, and the pH at from 4 to 5.1 while maintaining the temperature below the critical point of protein denaturation at from −3° C. to the freezing point of the solution, separating the resulting precipitate of said substance from the supernatant, preparing a solution of said precipitated substance in a water solution of non-toxic, non-allergenic, non-anaphylactogenic dipolar ions derived from an amino acid of the group consisting of glycine, taurine, leucine and alanine and filtering the solution through a sterile bacteriological filter.

3. The method according to claim 2 in which the first precipitate is formed into a solution in water and is re-precipitated by adjusting the alcohol concentration to from 15% to 50%, and the pH to from 4 to 5.6 at a temperature of from −3° C. to the freezing point of the solution.

4. The method according to claim 3 in which the precipitate from the second precipitation is formed into a water solution and the alcohol concentration is adjusted to from 2.5% and 10%, the pH from 3.75 to 4.3 at a temperature of from 0° C. to the freezing point of the solution, and the precipitate thus formed is discarded.

5. The method according to claim 4 in which the substance of the group consisting of tetanal toxin and toxoid is precipitated from the supernatant of the third precipitation by adjusting the alcohol concentration to from 15% to 40%, and the pH to from 4 to 5.8 at a temperature of from −5° C. to the freezing point of the solution.

6. The method according to claim 2 in which the substance of the group consisting of tetanal toxin and toxoid is separated from the solution in water thereof and of the other constituents of the crude culture by adjusting the alcohol concentration to 40% and the pH to 4.8 at a temperature of −5° C.

7. The method according to claim 6 in which the first precipitate is formed into a solution in water and is re-precipitated by adjusting the alcohol concentration to 25%, and the pH to 4.9 at a temperature of −5° C.

8. The method according to claim 7 in which the second precipitate is formed into a water solution and the alcohol concentration is adjusted to 7.5%, the pH to 4 at a temperature of −3° C. and the precipitate thus formed is discarded.

9. The method according to claim 8 in which the substance of the group consisting of tetanal toxin and toxoid is precipitated from the supernatant of the third precipitation by adjusting the alcohol concentration to 20% and the pH to 5.2 at a temperature of −5° C.

10. The method of producing a non-allergenic, non-anaphylactogenic product comprising a substance of the group consisting of tetanal toxin and toxoid from crude tetanal bacterial culture containing said substance which includes the step of separating said substance from a solution in water thereof and of the allergenic and anaphylactogenic constituents of said crude culture by adding to said solution an alcohol of the group consisting of methanol and ethanol and adjusting said solution to the minimum solubility point of said substance by controlling the concentration of said alcohol at from 25% to 50%, and the pH from 4 to 5.1, while maintaining the temperature below the critical point of protein denaturation at a temperature of from −3° C. to the freezing point of the solution, and separating the resulting precipitate of said substance from the supernatant.

11. The method according to claim 10 in which the first precipitate is formed into a solution in water and is re-precipitated by adjusting the alcohol concentration to from 15% to 50%, and the pH to from 4 to 5.6 at a temperature of from −3° C. to the freezing point of the solution.

12. The method according to claim 11 in which the precipitate from the second precipitation is formed into a water solution and the alcohol concentration is adjusted to from 2.5% to 10%, the pH to from 3.75 to 4.3 at a temperature of from 0° C. to the freezing point of the solution and the precipitate thus formed is discarded.

13. The method according to claim 12 in which the substance of the group consisting of tetanal toxin and toxoid is precipitated from the supernatant of the third precipitation by adjusting the alcohol concentration to from 15% to 40%, and the pH to from 4 to 5.8 at a temperature of from −5° C. to the freezing point of the solution.

14. The method of producing a sterile, stable, non-allergenic, non-anaphylactogenic product comprising a substance of the group consisting of staphylococcus toxoid and toxin from crude staphylococcus bacterial culture containing said substance which includes the step of separating said substance from a solution in water thereof and of the allergenic and anaphylactogenic constituents of said crude culture by adding to said solution an alcohol of the group consisting of methanol and ethanol and adjusting said solution to the minimum solubility point of said substance by controlling the concentration of said alcohol at from 10% to 50% and the pH at from 3.5 to 5 while maintaining the temperature below the critical point of protein denaturation at a temperature of from 0° C. to the freezing point of the solution, separating the resulting precipitate of said substance from the supernatant, preparing a solution of said precipitated substance in a water solution of non-toxic, non-allergenic, non-anaphylactogenic dipolar ions derived from an amino acid of the group consisting of glycine, taurine, leucine and alanine and filtering the solution through a sterile bacetriological filter.

15. The method according to claim 14 in which the toxoid is separated from the solution by adjusting the alcohol concentration to 15% and the pH to 4 at a temperature of −5° C.

16. The method of producing a non-allergenic, non-anaphylactogenic product comprising a substance of the group consisting of staphylococcus toxin and toxoid from crude staphylococcus bacterial culture containing said substance which includes the step of separating said substance from a solution in water thereof and of the allergenic and anaphylactogenic constituents of said crude culture by adding to said solution an alcohol of the group consisting of methanol and ethanol and adjusting said solution to the minimum solubility point of said substance by controlling the concentration of said alcohol at from 10% to 50%, and the pH at from 3.5 to 5, while maintaining the temperature below the critical point of protein denaturation at a temperature of from 0° C. to the freezing point of the solution, and separating the resulting precipitate of said substance from the supernatant.

17. The method of producing a sterile, stable non-allergenic, non-anaphylactogenic product comprising diphtherial toxoid from crude diphtherial culture containing said toxoid which includes the step of separating said toxoid from a solution in water of said toxoid and the allergenic and anaphylactogenic constituents and the porphyrins of the crude culture by adding to said solution an alcohol of the group consisting of methanol and ethanol and adjusting said solution to the minimum solubility point of said toxoid by controlling the concentration of said alcohol at not greater than 60% and the pH at from 3.8 to 5.85 while maintaining the temperature below the critical point of protein denaturation at a temperature of from 0° C. to the freezing point of the solution, separating the resulting precipitate of said toxoid from the supernatant, preparing a solution of said precipitated toxoid in a water solution of non-toxic, non-allergenic, non-anaphylactogenic dipolar ions derived from an amino acid of the group consisting of glycine, taurine, leucine and alanine and filtering the solution through a sterile bacteriological filter.

18. The method according to claim 17 in which the first precipitate is formed into a solution in water and is re-precipitated by adjusting the alcohol concentration to not greater than 60% and the pH to from 4 to 6.5 at a temperature of from 0° C. to the freezing point of the solution.

19. The method according to claim 18 in which the precipitate from the second precipitation is formed into a water solution and the alcohol concentration is adjusted to not greater than 10% and the pH to from 3.6 to 4.2 at a temperature of from 0° C. to the freezing point of the solution and the precipitate thus formed is discarded.

20. The method according to claim 19 in which the toxoid is precipitated from the supernatant of the third precipitation by adjusting the alcohol concentration to from 20% to 40% and the pH from 4 to 4.6 at a temperature of from −3° C. to the freezing point of the solution.

21. The method according to claim 20 in which the precipitate from the fourth precipitation is formed into a water solution and the alcohol concentration is adjusted to from 10% to 50% and the pH to from 4.8 to 5.8 at a temperature of from −3° C. to the freezing point of the solution to re-precipitate the toxoid.

22. The method according to claim 17 in which the toxoid is precipitated from the water solution thereof and of the other constituents of the crude culture by adjusting the alcohol concentration to 40% and the pH to 4.9 at a temperature of −5° C.

23. The method according to claim 22 in which the first precipitate is formed into a solution in water and is reprecipitated by adjusting the alcohol concentration to 40% and the pH to 5.8 at a temperature of −5° C.

24. The method according to claim 23 in which the second precipitate is formed into a water solution and the alcohol concentration is adjusted to 5% and the pH to 4 at a temperature of −3° C. and the precipitate is discarded.

25. The method according to claim 24 in which the toxoid is precipitated from the supernatant of the third precipitation by adjusting the alcohol concentration to 30% and the pH to 4.4 at a temperature of −5° C.

26. The method according to claim 25 in which the precipitate from the fourth precipitation is formed into a water solution and the toxoid is reprecipitated by adjusting the alcohol concentration to 25% and the pH to 5.4 at a temperature of −5° C.

27. The method of producing a non-allergenic, non-anaphylactogenic product comprising diphtherial toxoid from crude bacterial culture containing said toxoid which includes the step of separating said toxoid from a solution in water thereof and of the allergenic and anaphylactogenic constituents of said crude culture by adding to said solution an alcohol of the group consisting of methanol and ethanol and adjusting said solution to the minimum solubility point of said toxoid by adjusting the alcohol concentration to not greater than 60% and the pH at from 3.8 to 5.85 while maintaining the temperature below the critical point of protein denaturation at a temperature of from 0° C. to the freezing point of the solution.

28. The method according to claim 27 in which the first precipitate is formed into a solution in water and is re-precipitated by adjusting the alcohol concentration to not greater than 60% and the pH to from 4 to 6.5 at a temperature of from 0° C. to the freezing point of the solution.

29. The method according to claim 28 in which the precipitate is redissolved in water and the alcohol concentration is adjusted to not greater than 10%, and the pH at from 3.6 to 4.2 at a temperature of from 0° C. to the freezing point of the solution and the precipitate thus formed is discarded.

30. The method according to claim 29 in which the tetanal toxoid is precipitated from the supernatant of the last fractionation by adjusting the alcohol concentration to from 20% to 40% and the pH from 4 to 4.6 and the temperature from −3° to the freezing point of the solution.

31. The method according to claim 30 in which the precipitate from the last precipitation is formed into a water solution and is reprecipitated by adjusting the alcohol concentration to from 10% to 50% and the pH from 4.8 to 5.8 at a temperature of from −3° C. to the freezing point of the solution.

32. In the method of producing a sterile, stable, non-allergenic, non-anaphylactogenic toxoid produced from crude bacterial culture in which the toxoid becomes substantially unfilterable through a bacteriological filter because of the separation from the toxoid of allergenic, anaphylactogenic dipolar ions of the crude culture, the steps of forming a solution in water of said substantially unfilterable toxoid after its separation from said allergenic, anaphylactogenic dipolar ions and of non-toxic, non-allergenic, non-anaphylactogenic dipolar ions derived from amino acids of the group consisting of glycine, taurine, leucine and alanine and filtering said solution through a sterile, bacteriological filter.

33. The method according to claim 32 in which the toxoid is tetanal toxoid.

34. The method according to claim 32 in which the toxoid is diphtherial toxoid.

35. The method according to claim 32 in which the toxoid is staphylococcus toxoid.

36. The method according to claim 32 in which the amino acid is glycine.

37. The method according to claim 36 in which the toxoid is tetanal toxoid.

38. The method according to claim 36 in which the toxoid is diphtherial toxoid.

39. The method according to claim 36 in which the toxoid is staphylococcus toxoid.

40. A sterile, stable, non-allergenic, non-anaphylactogenic prophylactic agent free from dead and living micro-organisms and consisting essentially of a solution of, a mixture of, a toxoid and dipolar ions derived from amino acids of the group consisting of glycine, taurine, leucine and alanine in such amounts as to make the toxoid substantially non-adsorbable by a bacteriological filter.

41. A prophylactic agent defined in claim 40 in which the toxoid is tetanal toxoid.

42. A prophylactic agent defined in claim 40 in which the toxoid is diphtherial toxoid.

43. A prophylactic agent defined in claim 40 in which the toxoid is staphylococcus toxoid.

44. A prophylactic agent defined in claim 40 in which the amino acid is glycine.

45. A prophylactic agent defined in claim 44 in which the toxoid is tetanus toxoid.

46. A prophylactic agent defined in claim 44 in which the toxoid is diphtherial toxoid.

47. A prophylactic agent defined in claim 44 in which the toxoid is staphylococcus toxoid.

LOUIS PILLEMER.

REFERENCES CITED

The following references are of record in the file of this patent:

UNITED STATES PATENTS

| Number | Name | Date |
|---|---|---|
| 2,349,293 | Morrison | May 23, 1944 |
| 2,399,443 | Masucci | Apr. 30, 1946 |
| 2,405,740 | Flosdorf | Aug. 13, 1946 |

FOREIGN PATENTS

| Number | Country | Date |
|---|---|---|
| 56,575 | Denmark | Aug. 21, 1939 |

OTHER REFERENCES

Pillemer et al. in Science, vol. 103, May 17, 1946, pages 615–616; and January 24, 1947, pp. 102, 103.

Eaton in J. Bacteriology, vol. 31 (1936), pp. 347–365.

Eaton in J. Bacteriology, vol. 34 (1937), pp. 139–151.

Eaton in J. Bacteriology, vol. 36 (1938), pp. 423–432.

Pappenheimer in J. Biol. Chem., vol. 120 (1937), pp. 543–553.

Moloney in Biochem. J., vol. 36, September 1942, pp. 544–547.

Eldering in Am. J. Hygiene, vol. 34, Sect. B, July 1941, pp. 1–7.

Van Lanen in Science, vol. 92, No. 2396, November 29, 1940, pp. 512, 513.